(12) United States Patent
Murakami et al.

(10) Patent No.: US 11,566,940 B2
(45) Date of Patent: *Jan. 31, 2023

(54) SPECTROMETER MODULE

(71) Applicant: HAMAMATSU PHOTONICS K.K., Hamamatsu (JP)

(72) Inventors: Kazumasa Murakami, Hamamatsu (JP); Masayuki Adachi, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/137,654

(22) Filed: Dec. 30, 2020

(65) Prior Publication Data

US 2021/0231492 A1 Jul. 29, 2021

(30) Foreign Application Priority Data

Jan. 7, 2020 (JP) .............................. JP2020-000939

(51) Int. Cl.
| | | |
|---|---|---|
| *G01J 3/02* | (2006.01) | |
| *G01J 3/36* | (2006.01) | |
| *G02B 27/10* | (2006.01) | |

(52) U.S. Cl.
CPC ............. *G01J 3/021* (2013.01); *G01J 3/0208* (2013.01); *G01J 3/0291* (2013.01); *G01J 3/36* (2013.01); *G02B 27/1006* (2013.01)

(58) Field of Classification Search
CPC .. G01J 2003/1226; G01J 3/0208; G01J 3/021; G01J 3/0291; G01J 3/36; G02B 27/1006; G02B 27/1013; G02B 27/141; G02B 27/145; G02B 5/201; G02B 5/285

See application file for complete search history.

(56) References Cited

U.S. PATENT DOCUMENTS

| | | | |
|---|---|---|---|
| 11,248,957 B2 * | 2/2022 | Murakami | ............. G02B 7/006 |
| 2007/0153281 A1 * | 7/2007 | Gordon | .................. G01N 21/86 |
| | | | 356/419 |
| 2021/0208412 A1 * | 7/2021 | Murakami | ......... G02B 27/1006 |

FOREIGN PATENT DOCUMENTS

JP     2012-242117 A     12/2012

* cited by examiner

*Primary Examiner* — Hina F Ayub
(74) *Attorney, Agent, or Firm* — Faegre Drinker Biddle & Reath LLP

(57) ABSTRACT

A spectroscopic module includes a plurality of beam splitters; a plurality of bandpass filters disposed on one side in a Z direction with respect to the plurality of beam splitters; a light detector disposed on the one side in the Z direction with respect to the plurality of bandpass filters and includes a plurality of light receiving regions; a first support body supporting the plurality of beam splitters; a second support body supporting the plurality of bandpass filters; and a casing including a third wall portion integrally formed with the second support body. The first support body is attached to the third wall portion such that an outer surface of the first support body is in contact with an inner surface of the third wall portion in a state where the position is defined by a plurality of positioning pins and a plurality of positioning holes.

18 Claims, 9 Drawing Sheets

Fig.2
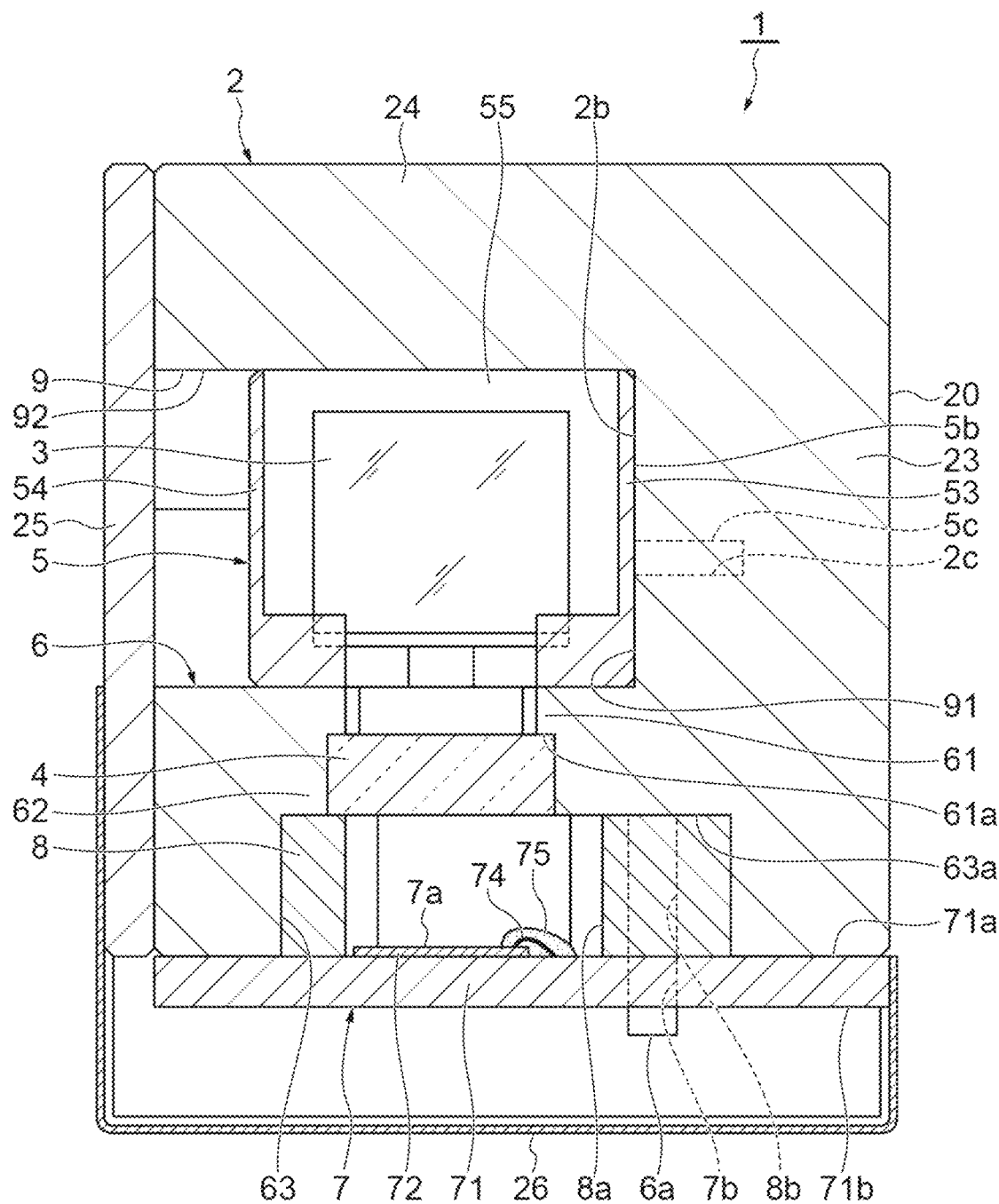
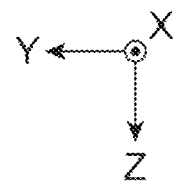

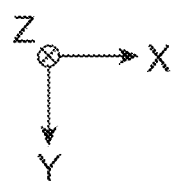
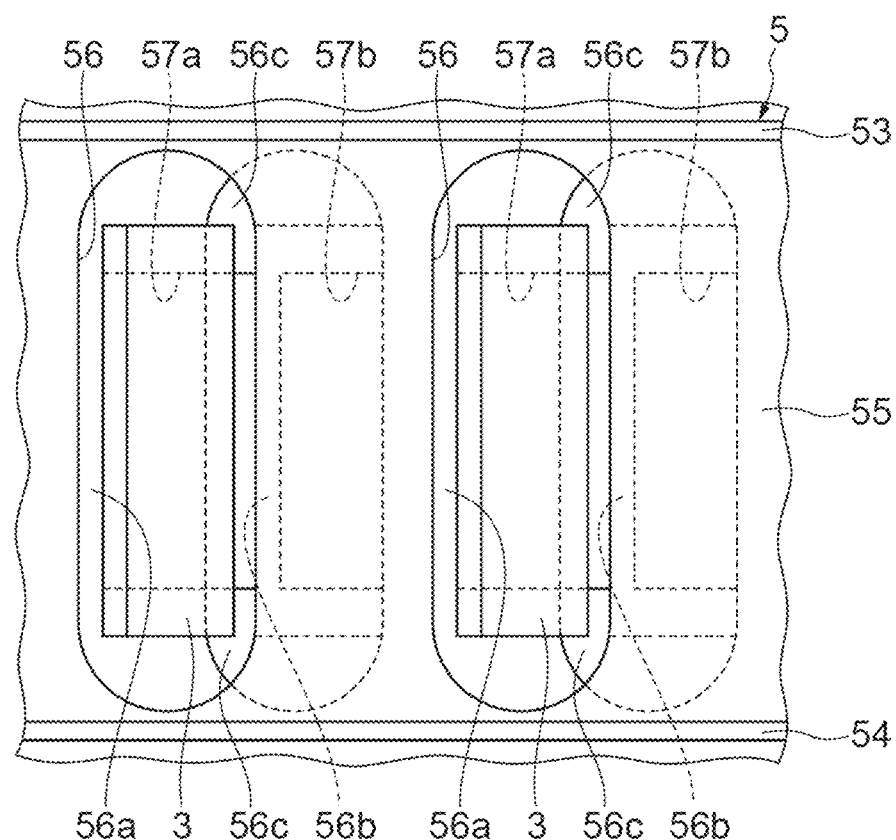

SPECTROMETER MODULE

TECHNICAL FIELD

The present disclosure relates to a spectroscopic module.

BACKGROUND

As a spectroscopic module that splits measurement light into light in a plurality of wavelength bands to detect the light in each of the wavelength bands, there is known a device in which a plurality of beam splitters and a plurality of bandpass filters are disposed in a casing (for example, refer to Japanese Unexamined Patent Publication No. 2012-242117).

SUMMARY

In the spectroscopic module described above, the securing of the positional accuracy between each other in the plurality of beam splitters and the plurality of bandpass filters (namely, the positional accuracy between the beam splitters adjacent to each other, the positional accuracy between the bandpass filters adjacent to each other, and the positional accuracy between the beam splitter and the bandpass filter facing each other) is important in improving spectral accuracy.

An object of the present disclosure is to provide a spectroscopic module capable of securing the positional accuracy between each other in a plurality of beam splitters and a plurality of bandpass filters.

According to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; a first support body that supports the plurality of beam splitters; a second support body that supports the plurality of bandpass filters; and a casing that includes a wall portion integrally formed with the second support body and accommodates the plurality of beam splitters and the plurality of bandpass filters. An outer surface parallel to both the first direction and the second direction is formed in the first support body. An inner surface parallel to both the first direction and the second direction is formed in the wall portion. At least one of the second support body and the casing includes a defining portion that defines a position of the first support body in a plane parallel to both the first direction and the second direction. The first support body is attached to the wall portion such that the outer surface is in contact with the inner surface in a state where the position is defined by the defining portion.

Alternatively, according to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; a first support body that supports the plurality of beam splitters; a second support body that supports the plurality of bandpass filters; and a casing that includes a wall portion integrally formed with the second support body and accommodates the plurality of beam splitters and the plurality of bandpass filters. An outer surface is formed in the first support body. An inner surface is formed in the wall portion. The first support body is attached to the wall portion such that at least a part of the outer surface is in contact with at least a part of the inner surface.

BRIEF DESCRIPTION OF THE DRAWINGS

FIG. 2 is a cross-sectional view along line II-II illustrated in FIG. 1.

FIG. 3 is a plan view of a portion of a first support body illustrated in FIG. 1.

DETAILED DESCRIPTION

Figure 1:
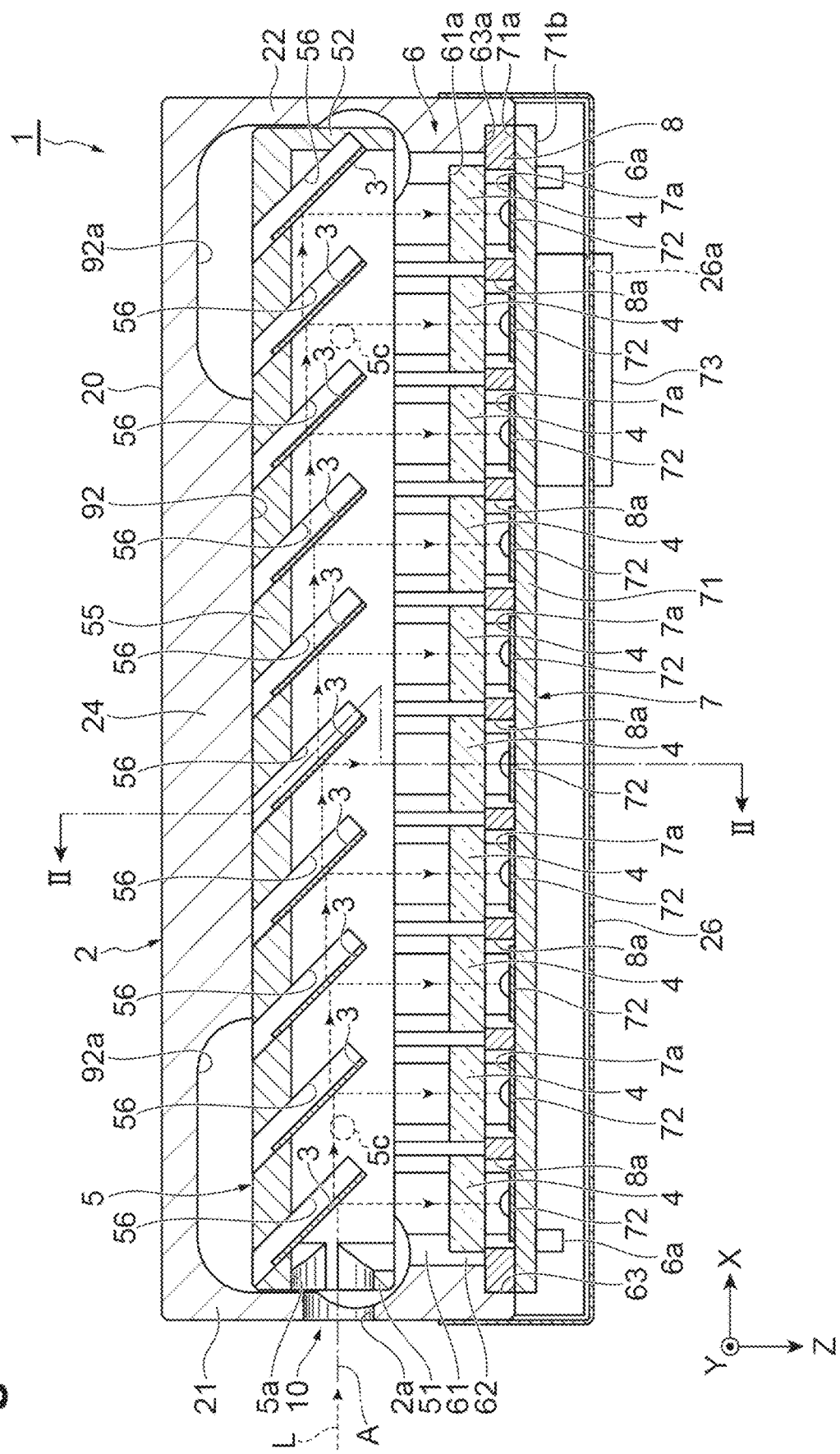
FIG. 1 is a cross-sectional view of a spectroscopic module of one embodiment.

Hereinafter, an embodiment of the present disclosure will be described in detail with reference to the drawings. Incidentally, in the drawings, the same or equivalent portions are denoted by the same reference signs, and duplicated descriptions will be omitted.

As illustrated in FIGS. 1 and 2, a spectroscopic module 1 is a spectrometer module which includes a casing 2, a plurality of beam splitters 3, a plurality of bandpass filters 4, a first support body 5, a second support body 6, a light detector 7, and a light shielding member 8. The plurality of beam splitters 3 are arranged along an X direction (first direction). The plurality of bandpass filters 4 are disposed on one side in a Z direction perpendicular to the X direction (second direction intersecting the first direction) with respect to the plurality of beam splitters 3. The light detector 7 is disposed on the one side in the Z direction with respect to the plurality of bandpass filters 4. The light detector 7 includes a plurality of light receiving regions 7a.

Each of the beam splitters 3 is, for example, a half mirror, and reflects a part of light, which is incident along the X direction, to the one side in the Z direction and transmits light, which is other than the part of the incident light, to one side in the X direction. Each of the bandpass filters 4 faces each of the beam splitters 3 in the Z direction, and transmit light in a predetermined wavelength band of the light, which is incident from the beam splitters 3 along the Z direction, to the one side in the Z direction. The bandpass filters 4 each transmit light in different wavelength bands. Each of the light receiving regions 7a faces each of the bandpass filters 4 in the Z direction, and detect the light incident from the bandpass filters 4 along the Z direction. The light receiving regions 7a form different light detection channels, respectively. In the spectroscopic module 1, measurement light L is split into light in a plurality of wavelength bands by the plurality of beam splitters 3 and the plurality of bandpass filters 4, and the light in each of the wavelength bands is detected by the light detector 7.

As illustrated in FIGS. 1 and 2, the casing 2 is a housing which accommodates the plurality of beam splitters 3, the plurality of bandpass filters 4, the first support body 5, the second support body 6, the light detector 7, and the light shielding member 8. The casing 2 includes a main body portion 20. The main body portion 20 is formed of a first wall portion 21, a second wall portion 22, a third wall portion (wall portion) 23, and a fourth wall portion 24. The first wall portion 21 and the second wall portion 22 face each other in the X direction. The second wall portion 22 is located on the one side in the X direction with respect to the first wall portion 21. The third wall portion 23 is located on one side in a Y direction perpendicular to both X direction and the Z direction with respect to the first wall portion 21 and the second wall portion 22. The fourth wall portion 24 is located on the other side (side opposite the one side) in the Z direction with respect to the first wall portion 21, the second wall portion 22, and the third wall portion 23. The casing 2 has a long shape having the X direction as a longitudinal direction.

A first light incident hole 2a through which the measurement light L is incident into the casing 2 along the X direction is formed in the first wall portion 21. An inner surface 2b parallel to both the X direction and the Z direction is formed in the third wall portion 23. Each of a plurality of positioning holes (defining portion, second engagement portion) 2c formed in the third wall portion 23 is open to the inner surface 2b. The third wall portion 23 is integrally formed with the second support body 6. The main body portion 20 and the second support body 6 form a recessed portion 9 having the inner surface 2b of the third wall portion 23 as a bottom surface 91. Namely, the casing 2 defines the recessed portion 9 having the inner surface 2b of the third wall portion 23 as the bottom surface 91. The main body portion 20 and the second support body 6 are integrally formed from, for example, metal.

The casing 2 further includes a cover portion 25 and a shield cover 26. The cover portion 25 is attached to the main body portion 20 and the second support body 6 to close an opening of the recessed portion 9. The shield cover 26 is attached to the main body portion 20 and the cover portion 25 to cover the light detector 7 from the one side in the Z direction.

As illustrated in FIGS. 1 and 2, the first support body 5 supports the plurality of beam splitters 3. Each of the beam splitters 3 has a plate shape and has a thickness of 1 mm or less. Each of the beam splitters 3 has a long shape when seen in a thickness direction of each of the beam splitters 3, and a direction perpendicular to a longitudinal direction of each of the beam splitters 3 is a direction parallel to the Y direction. The beam splitters 3 each have the same shape. Each of the beam splitters 3 has, for example, a rectangular plate shape.

The first support body 5 is formed of a first wall portion 51, a second wall portion 52, a third wall portion 53, a fourth wall portion 54, and a fifth wall portion 55. The first wall portion 51 and the second wall portion 52 face each other in the X direction. The second wall portion 52 is located on the one side in the X direction with respect to the first wall portion 51. The third wall portion 53 and the fourth wall portion 54 face each other in the Y direction. The third wall portion 53 is located on the one side in the Y direction with respect to the first wall portion 51 and the second wall portion 52. The fourth wall portion 54 is located on the other side in the Y direction with respect to the first wall portion 51 and the second wall portion 52. The fifth wall portion 55 is located on the other side in the Z direction with respect to the first wall portion 51, the second wall portion 52, the third wall portion 53, and the fourth wall portion 54. The first support body 5 has a long shape having the X direction as a longitudinal direction. The first support body 5 is integrally formed from, for example, metal.

A second light incident hole 5a through which the measurement light L is incident on the plurality of beam splitters 3 along the X direction is formed in the first wall portion 51. An outer surface 5b parallel to both the X direction and the Z direction is formed in the third wall portion 53. The outer surface 5b is provided with a plurality of positioning pins (first engagement portion) 5c. The first support body 5 is attached to the third wall portion 23 such that the outer surface 5b is in contact with the inner surface 2b of the casing 2 in a state where each of the positioning pins 5c is fitted into each of the positioning holes 2c of the casing 2, to define the position of the first support body 5 in a plane (along the plane) parallel to both the X direction and the Z direction.

The first support body 5 is disposed in the recessed portion 9 in a state where the outer surface 5b is in contact with the inner surface 2b of the casing 2 (namely, the bottom surface 91 of the recessed portion 9). A side surface 92 of the recessed portion 9 includes a plurality of separation regions 92a. Each of the separation regions 92a is separated from the first support body 5. In the present embodiment, the side surface 92 is formed of inner surfaces of the first wall portion 21, the second wall portion 22, and the fourth wall portion 24 of the main body portion 20 and a surface of the second support body 6, the surface being on the fourth wall portion 24 side. Incidentally, the side surface 92 may include at least one separation region 92a. In addition, the separation region 92a may be the entirety of the side surface 92.

A plurality of grooves 56 are formed in the first support body 5. Each of the beam splitters 3 is disposed in each of the grooves 56. Accordingly, the first support body 5 is provided with a plurality of combinations of the grooves 56 and the beam splitters 3. Hereinafter, each of the plurality of combinations is referred to as a "corresponding groove 56 and beam splitter 3".

As illustrated in FIGS. 1 and 3, each of the grooves 56 is open to an outer surface of the fifth wall portion 55. An extending direction of each of the grooves 56 is a direction parallel to the Y direction. A depth direction of each of the grooves 56 is a direction which is inclined by 45° such that the deeper the groove 56 is, the closer to the one side in the X direction the groove 56 is located, among directions perpendicular to the Y direction. Each of the grooves 56 has a pair of side surfaces 56a and 56b and a bottom surface 56c. The pair of side surfaces 56a and 56b face each other in a width direction (direction perpendicular to both extending direction and the depth direction) of each of the grooves 56. A light passage opening 57a is formed in the side surface 56a and a light passage opening 57b is formed in the side surface 56b.

In the present embodiment, each of the grooves 56 is formed such that both end portions in the extending direction of the groove 56 are located in the third wall portion 53 and the fourth wall portion 54, respectively. The side surface 56a is cut out by a space between the third wall portion 53 and the fourth wall portion 54 facing each other in the Y direction, so that the light passage opening 57a is formed in the side surface 56a. The side surface 56b is cut out by the space, so that the light passage opening 57b is formed in the side surface 56b. In addition, the bottom surface 56c is separated into two regions in the Y direction.

In the corresponding groove 56 and beam splitter 3, the groove 56 has a width (namely, a distance between the pair of the side surfaces 56a and 56b) twice or more the thickness of the beam splitter 3. As one example, the thickness of the beam splitter 3 is 0.5 mm, and the width of the groove 56 is 2.5 mm to 3.0 mm. In the corresponding groove 56 and beam splitter 3, the beam splitter 3 is disposed in the groove 56 so as to be in contact with the side surface 56a and the bottom surface 56c, the side surface 56a being located on the one side of the pair of side surfaces 56a and 56b in the Z direction. In this state, the beam splitter 3 is fixed to the side surface 56a and the bottom surface 56c with, for example, adhesive agent.

As illustrated in FIG. 1, in the spectroscopic module 1, a light incident portion 10 is formed of the first light incident hole 2a and the second light incident hole 5a. The light incident portion 10 defines light to be incident on the plurality of beam splitters 3 along the X direction. The second light incident hole 5a includes the first light incident hole 2a when seen in the X direction. In this case, a center line of the first light incident hole 2a is an optical axis A of the light incident portion 10. As one example, when seen in the X direction, the first light incident hole 2a has a circular shape, and the second light incident hole 5a has an oval shape having the Z direction as a longitudinal direction. As one example, when seen in the X direction, the first light incident hole 2a overlaps a portion on the one side in the Z direction of the second light incident hole 5a. Accordingly, when the beam splitters 3 are disposed in the first support body 5, the centers of the beam splitters 3 can be confirmed through the first light incident hole 2a and the second light incident hole 5a.

Figure 4:
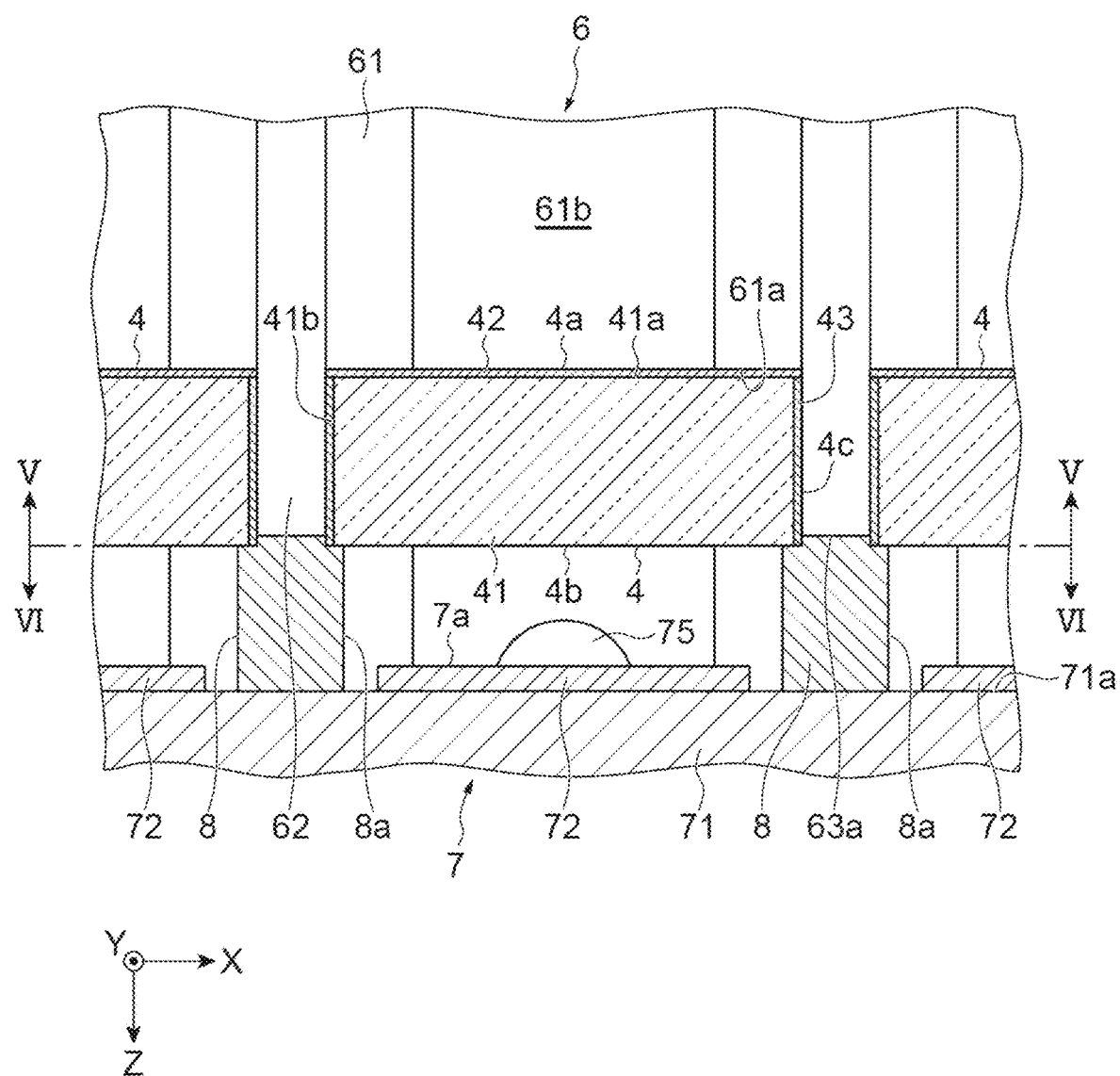
FIG. 4 is a cross-sectional view of a portion of a second support body illustrated in FIG. 1.
Figure 5:
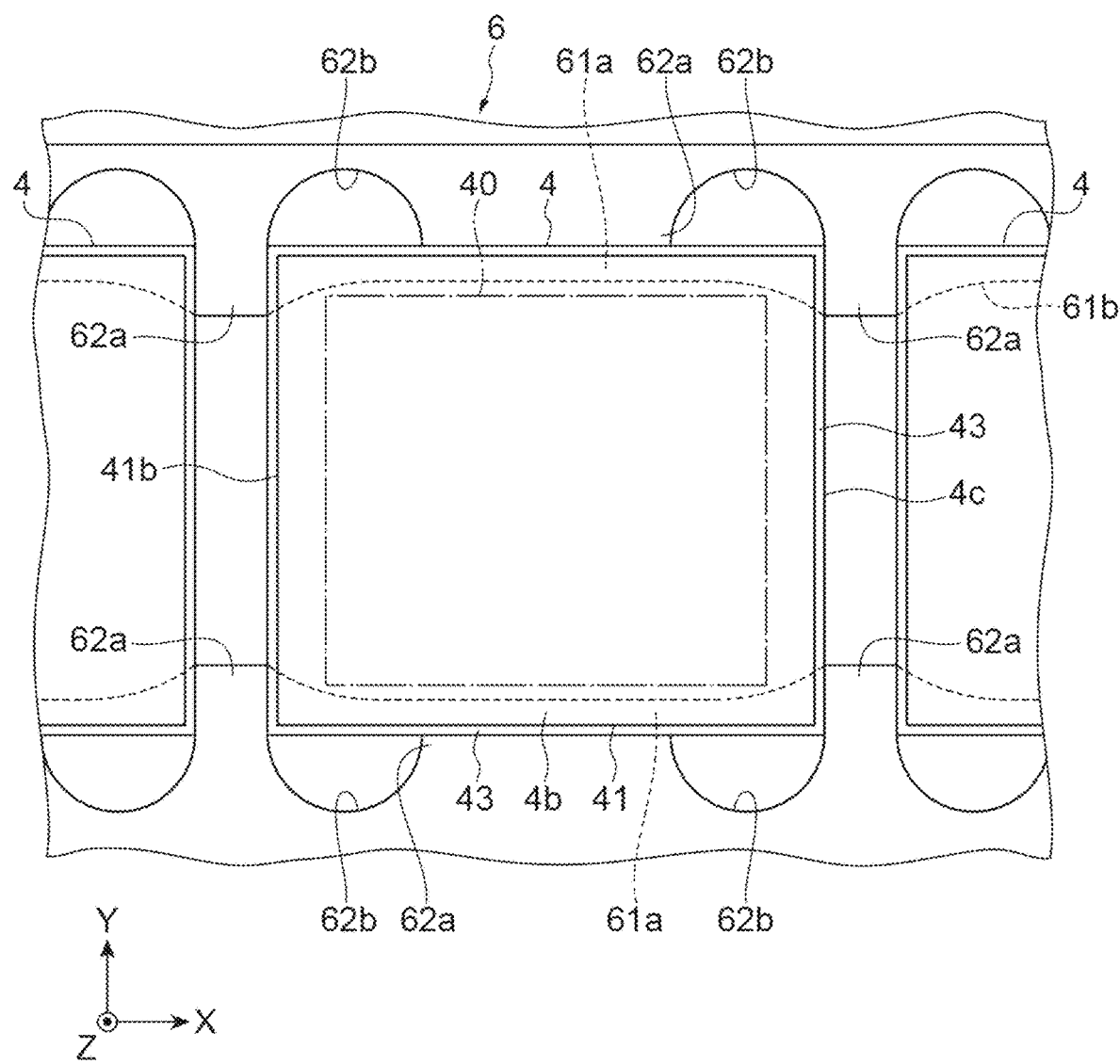
FIG. 5 is a cross-sectional view along line V-V illustrated in FIG. 4.

As illustrated in FIGS. 4 and 5, the second support body 6 supports the plurality of bandpass filters 4. Each of the bandpass filters 4 includes a light transmitting substrate 41, an interference film 42, and a light shielding film 43. The light transmitting substrate 41 has, for example, a rectangular plate shape. The interference film 42 is provided on a light incident surface 41a of the light transmitting substrate 41. The interference film 42 is, for example, a dielectric multilayer film. The light shielding film 43 is provided on a side surface 41b of the light transmitting substrate 41. The light shielding film 43 is, for example, a black paint film. In each of the bandpass filters 4, a surface on an opposite side of the interference film 42 from the light transmitting substrate 41 is a light incident surface 4a of the bandpass filter 4, a surface on an opposite side of the light transmitting substrate 41 from the interference film 42 is a light outgoing surface 4b of the bandpass filter 4, and an outer surface of the light shielding film 43 is a side surface 4c of the bandpass filter 4. Incidentally, in FIGS. 1 and 2, each of the bandpass filters 4 is illustrated in a state where the configuration is simplified.

The second support body 6 includes a support portion 61. A support surface 61a is formed in the support portion 61 so as to be open to the one side in the Z direction. The fact that the support surface 61a is open to the one side in the Z direction means that when the support portion 61 is seen from the one side in the Z direction in a state where there is only the second support body 6, the support surface 61a is exposed (namely, that the support surface 61a is visible). The plurality of bandpass filters 4 are disposed on the support surface 61a to be arranged along the X direction. The support surface 61a is a surface perpendicular to the Z direction, and is formed in the support portion 61 such that a region on the light incident surface 4a of each of the bandpass filters 4 is in contact with the support surface 61a, the region being located outside a clear aperture 40. The clear aperture 40 is an effective opening region in which the function of the bandpass filter 4 is guaranteed. One light passage opening 61b through which a plurality of optical paths (dotted line illustrated in FIG. 1) from the plurality of beam splitters 3 to the plurality of bandpass filters 4 pass is formed in the support portion 61. Accordingly, the support surface 61a is separated into two regions in the Y direction.

The second support body 6 further includes a restriction portion 62. The restriction portion 62 is provided in the second support body 6 so as to be located on the one side in the Z direction with respect to the support portion 61. The restriction portion 62 restricts each of the bandpass filters 4 from moving in a direction perpendicular to the Z direction. The restriction portion 62 is formed of a plurality of contact portions 62a that are provided so as to be in contact with the side surface 4c of each of the bandpass filters 4, and a plurality of separation portions 62b that are provided so as to be separated from the side surface 4c of each of the bandpass filters 4. The restriction portion 62 does not completely partition the plurality of bandpass filters 4 off from each other. Namely, the plurality of bandpass filters 4 are separated from each other with a space interposed therebetween in a state where the movement thereof in the direction perpendicular to the Z direction is restricted by the restriction portion 62.

As illustrated in FIGS. 1 and 2, a recessed portion 63 which is open to the one side in the Z direction is formed in the second support body 6. A bottom surface 63a of the recessed portion 63 is a surface on an opposite side of the restriction portion 62 from the support portion 61. The distance between the support surface 61a and the bottom surface 63a in the Z direction is smaller than the thickness of each of the bandpass filters 4 (namely, a distance between the light incident surface 4a and the light outgoing surface 4b in the Z direction). Accordingly, a portion on an opposite side of each of the bandpass filters 4 from the support portion 61 protrudes from the bottom surface 63a, and the light outgoing surface 4b of each of the bandpass filters 4 is located on the one side in the Z direction from the bottom surface 63a (refer to FIG. 4). The bottom surface 63a is provided with a plurality of positioning pins 6a.

As illustrated in FIGS. 1 and 2, the light detector 7 includes a wiring substrate 71, a plurality of light detection elements 72, and a connector 73. The plurality of light detection elements 72 are mounted on a surface 71a to be arranged along the X direction, the surface 71a being on a plurality of bandpass filters 4 side of the wiring substrate 71. Each of the light detection elements 72 is a discrete semiconductor element such as a PD chip, and has the light receiving region 7a. The connector 73 is attached to a surface 71b, the surface 71b being on an opposite side of the wiring substrate 71 from the surface 71a. The connector 73 is a port through which an electric signal or the like is input to and output from each of the light detection elements 72. The connector 73 extends outside the casing 2 through an opening 26a formed in the shield cover 26. The light detector 7 is attached to the second support body 6 so as to close an opening of the recessed portion 63. In the present embodiment, the wiring substrate 71 is attached to the second support body 6 to close the opening of the recessed portion 63, and the plurality of light detection elements 72 are disposed in the recessed portion 63.

The light shielding member 8 is disposed between the plurality of bandpass filters 4 and the light detector 7. The light shielding member 8 is made of an elastic material, and is disposed in the recessed portion 63 of the second support body 6 in a state where the light shielding member 8 is compressed. In this state, the plurality of bandpass filters 4 are held between the support portion 61 of the second support body 6 and the light shielding member 8. A plurality of light passage openings 8a are formed in the light shielding member 8. Each of a plurality of optical paths from the plurality of bandpass filters 4 to the plurality of light receiving regions 7a passes through each of the plurality of light passage openings 8a. Namely, the plurality of optical paths from the plurality of bandpass filters 4 to the plurality of light receiving regions 7a are separated from each other by the light shielding member 8. In the present embodiment, each of the light detection elements 72 of the light detector 7 is located inside each of the light passage openings 8a of the light shielding member 8. In each of the light passage openings 8a, a terminal of the light detection element 72 and a terminal of the wiring substrate 71 are electrically connected by a wire 74, and the wire 74 is covered with a resin member 75.

Figure 6:
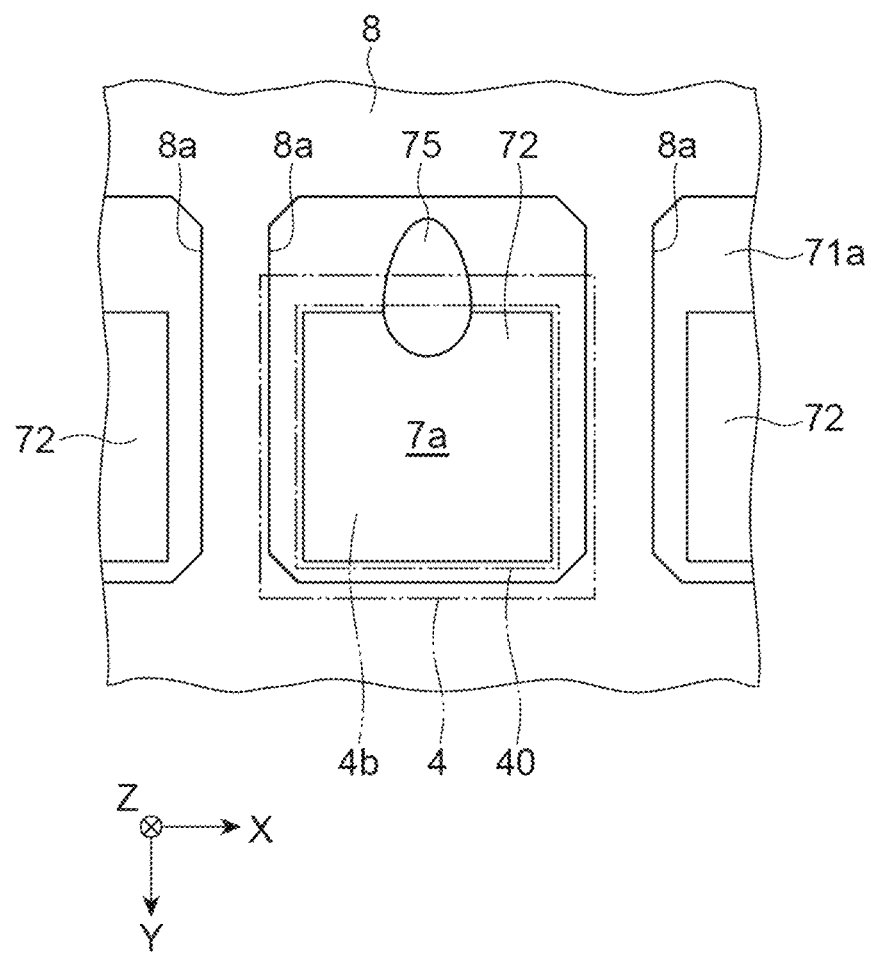
FIG. 6 is a cross-sectional view along line VI-VI illustrated in FIG. 4.

As illustrated in FIG. 6, each of the light passage openings 8a is formed in the light shielding member 8 such that a region on the light outgoing surface 4b of each of the bandpass filters 4 is in contact with the light shielding member 8, the region being located outside the clear aperture 40. Namely, the light shielding member 8 is formed such that a region on the light outgoing surface 4b of each of the bandpass filters 4 is in contact with the light shielding member 8, the region being located outside the clear aperture 40. Incidentally, in FIG. 6, the bandpass filter 4 is illustrated with an alternate long and two short dashes line.

As illustrated in FIG. 2, a plurality of positioning holes 8b are formed in the light shielding member 8. A plurality of positioning holes 7b are formed in the wiring substrate 71. Each of the positioning holes 7b overlaps each of the positioning holes 8b when seen in the Z direction. The light shielding member 8 is disposed in the recessed portion 63 in a state where each of the positioning pins 6a of the second support body 6 is fitted into each of the positioning holes 8b, to define the position of each of the light passage openings 8a in the direction perpendicular to the Z direction. The light detector 7 is attached to the second support body 6 in a state where each of the positioning pins 6a which has penetrated through the positioning hole 8b of the light shielding member 8 is fitted into each of the positioning holes 7b, to define the position of each of the light receiving regions 7a in the direction perpendicular to the Z direction.

Figure 7:
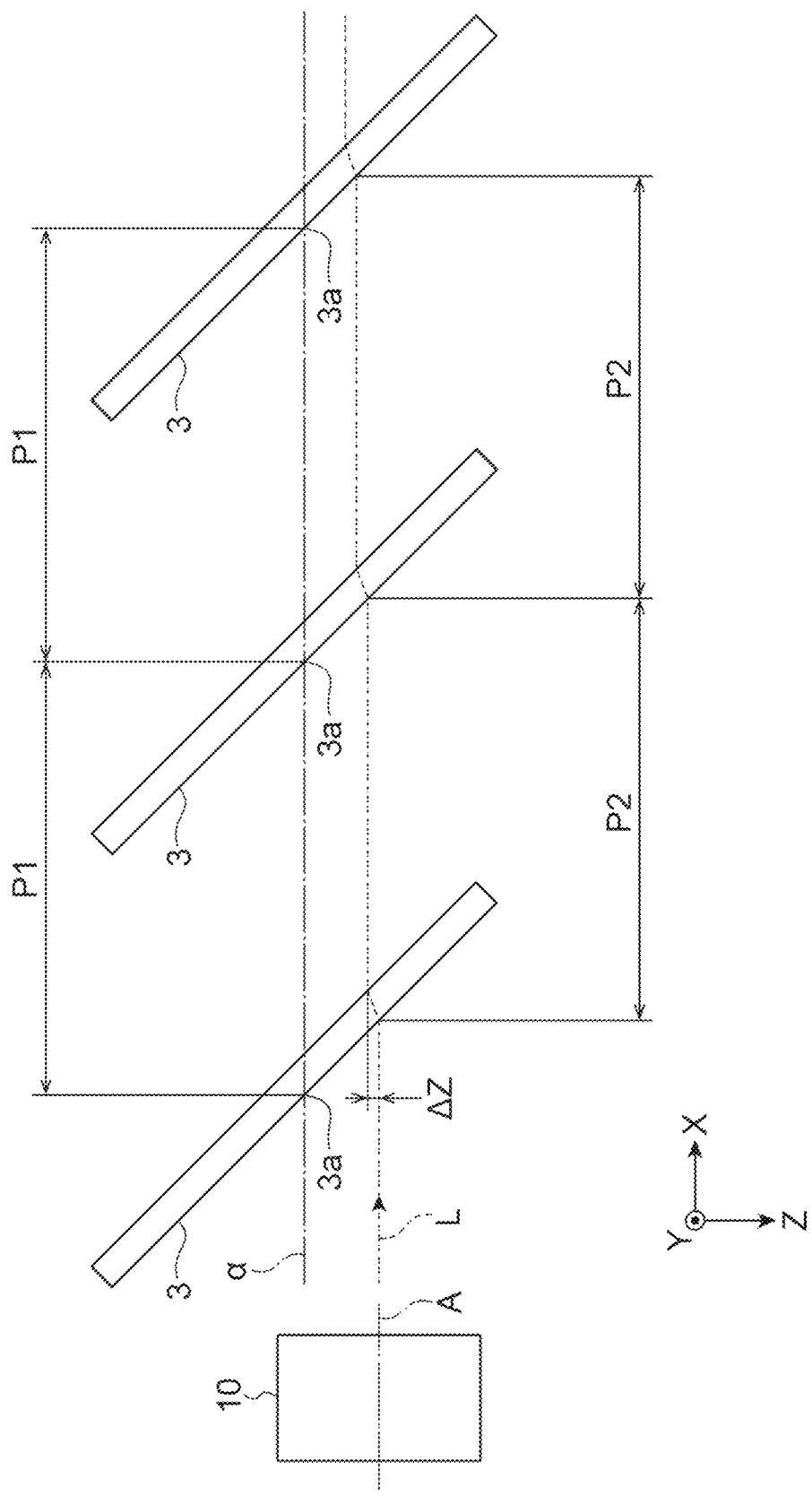
FIG. 7 is a view illustrating the dispositional relationship of a plurality of beam splitters with respect to the optical axis of a light incident portion.

As illustrated in FIG. 7, the plurality of beam splitters 3 are disposed such that a center 3a of each of the beam splitters 3 is located on a line α parallel to the X direction. The center 3a of the beam splitter 3 is the center (center of gravity) of the beam splitter 3 when seen in the thickness direction of the beam splitter 3. The beam splitters 3 each have the same thickness of 1 mm or less, and are disposed such that light is incident at an angle of incidence of 45° along the X direction. The optical axis A of the light incident portion 10 is located on the one side in the Z direction with respect to the line α passing through the center 3a of each of the beam splitters 3. Incidentally, in FIG. 7, the light incident portion 10 is schematically illustrated.

Since refraction of light occurs in each of the beam splitters 3, the optical axis of transmitted light is shifted to a side (side opposite the one side in the Z direction) away from the optical axis A of the light incident portion 10 with respect to the optical axis of incident light. In the spectroscopic module 1, since the beam splitters 3 each have the same thickness and the beam splitters 3 each are disposed such that light is incident at an angle of incidence of 45° along the X direction, the beam splitters 3 each have the same amount of light refraction. The amount of light refraction means an amount by which the optical axis of the transmitted light is shifted to the side away from the optical axis A of the light incident portion 10 with respect to the optical axis of the incident light in the beam splitter 3.

When the amount of light refraction in each of the beam splitters 3 is $\Delta Z$ and the number of the beam splitters 3 is M, the distance between "the optical axis of light incident on the beam splitter 3 of the foremost stage" and "the optical axis of light incident on the beam splitter 3 of the rearmost stage" in the Z direction is $\Delta Z(M-1)$. The beam splitter 3 of the foremost stage means the beam splitter 3 disposed in the foremost stage (on an upstream side in a traveling direction of light), and the beam splitter 3 of the rearmost stage means the beam splitter 3 disposed in the rearmost stage (on a downstream side in the traveling direction of light).

In the spectroscopic module 1, the plurality of beam splitters 3 are disposed with respect to the optical axis A of the light incident portion 10 such that the distance between the optical axis A and the line α in the Z direction is $\Delta Z(M-1)/2$. Accordingly, in the beam splitter 3 disposed in a middle stage (on a midstream side in the traveling direction of light), the optical axis of incident light passes through the center 3a or the vicinity of the center 3a of the beam splitter 3.

As one example, when the thickness of each of the beam splitters 3 is 0.5 mm, the refractive index is 1.5, the angle of incidence to the beam splitter 3 is 45°, and the number of the beam splitters 3 disposed is 10, the value of an amount $\Delta Z$ of light refraction is 0.165 mm Therefore, the distance between the optical axis A and the line α in the Z direction is $\Delta Z(M-1)/2=0.165\times(10-1)/2$=approximately 0.74 mm. In this case, in each of the beam splitters 3 of a fifth stage and a sixth stage from the foremost stage, the optical axis of incident light passes through the vicinity of the center 3a of the beam splitter 3. When the diameter of the measurement light L which is defined by the light incident portion 10 (namely, the diameter of light incident on the beam splitter 3 of the foremost stage) is 4 mm, if the length in the longitudinal direction of each of the beam splitters 3 is 10 mm, the incident light is contained in the clear apertures in all the beam splitters 3.

In the spectroscopic module 1, the arrangement pitch of the plurality of beam splitters 3 is a value obtained by adding the amount of light refraction in each of the beam splitters 3 to the arrangement pitch of the plurality of light receiving regions 7a. The arrangement pitch of the plurality of beam splitters 3 means "a distance between the centers 3a of the beam splitters 3 adjacent to each other" when the plurality of beam splitters 3 are arranged at equal intervals along the X direction. The arrangement pitch of the plurality of light receiving regions 7a means "a distance between the centers of the light receiving regions 7a adjacent to each other" when the plurality of light receiving regions 7a are arranged at equal intervals along the X direction. When the arrangement pitch of the plurality of beam splitters 3 is P1 and the arrangement pitch of the plurality of light receiving regions 7a is P2, $P1=P2+\Delta Z$. Therefore, when the number of the beam splitters 3 is M, the distance between "the beam splitter 3 of the foremost stage" and "the beam splitter 3 of the rearmost stage" in the X direction is P1(M−1)=(P2+ΔZ) (M−1)=P2(M−1)+ΔZ(M−1). As described above, the arrangement pitch of the plurality of beam splitters 3 is cumulatively affected by not only the arrangement pitch of the plurality of light receiving regions 7*a* but also the amount of light refraction in each of the beam splitters 3.

From the above viewpoint, "in the entirety of the plurality of beam splitters 3, the total accumulated amount of light refraction is sufficiently reduced on the side away from the bandpass filters 4 and on a rear stage side in a direction in which the plurality of beam splitters 3 are lined up, so that the size of the entirety of the module is reduced", each of the beam splitters 3 preferably has a thickness of 1 mm or less, and more preferably has a thickness of 0.5 mm or less. However, from the viewpoint that the strength of the beam splitter 3 is secured, it is preferable that each of the beam splitters 3 has a thickness of 0.1 mm or more.

In the spectroscopic module 1, the plurality of beam splitters 3 are supported on the first support body 5, and the plurality of bandpass filters 4 are supported on the second support body 6. Accordingly, as compared with when the plurality of beam splitters 3 and the plurality of bandpass filters 4 are supported on the same support body that is integrally formed, in the first support body 5, the positional accuracy between the beam splitters 3 adjacent to each other can be further secured due to a structure corresponding to the plurality of beam splitters 3, and in the second support body 6, the positional accuracy between the bandpass filters 4 adjacent to each other can be further secured due to a structure corresponding to the plurality of bandpass filters 4. In addition, the third wall portion 23 of the casing 2 is integrally formed with the second support body 6, and the first support body 5 is attached to the third wall portion 23 of the casing 2 to be in surface contact with the third wall portion 23 in a state where the position of the first support body 5 is defined by the plurality of positioning pins 5*c* and the plurality of positioning holes 2*c*. Accordingly, the positional accuracy between the beam splitter 3 and the bandpass filter 4 facing each other can be secured. Further, since the strength of the casing 2 is improved, a problem with a positional relationship between each other in the plurality of beam splitters 3 and the plurality of bandpass filters 4, which is caused by deformation or the like of the casing 2, is unlikely to occur. As a result, according to the spectroscopic module 1, the positional accuracy between each other in the plurality of beam splitters 3 and the plurality of bandpass filters 4 can be secured.

In addition, in the spectroscopic module 1, the plurality of positioning holes 2*c* are formed in the casing 2, and the plurality of positioning pins 5*c* are provided in the first support body 5, each of the plurality of positioning pins 5*c* fitted into each of the plurality of positioning holes 2*c*. Accordingly, with a simple structure, the first support body 5 can be positioned with respect to the casing 2, so that the first support body 5 can be positioned with respect to the second support body 6 which is integrally formed with the third wall portion 23 of the casing 2. Therefore, the positional accuracy between the beam splitter 3 and the bandpass filter 4 facing each other can be easily and reliably secured.

In addition, in the spectroscopic module 1, the casing 2 defines the recessed portion 9 having the inner surface 2*b* as the bottom surface 91, and the side surface 92 of the recessed portion 9 includes the separation regions 92*a* that are separated from the first support body 5. Accordingly, for example, during production of the spectroscopic module 1, when damage or the like is found in the beam splitter 3, for example, a jig is inserted between the first support body 5 and the separation regions 92*a*, so that the first support body 5 which supports the beam splitter 3 can be easily removed from the recessed portion 9.

In addition, in the spectroscopic module 1, when seen in the X direction, the second light incident hole 5*a* formed in the first support body 5 includes the first light incident hole 2*a* formed in the casing 2. Accordingly, it can be suppressed that light incident from the first light incident hole 2*a* is diffusely reflected around the second light incident hole 5*a* to generate stray light and the stray light enters the casing 2.

In addition, in the spectroscopic module 1, each of the beam splitters 3 has a plate shape and is disposed in each of the grooves 56 formed in the first support body 5, and in the corresponding groove 56 and beam splitter 3, the groove 56 has a width twice or more the thickness of the beam splitter 3. Accordingly, during production of the spectroscopic module 1, the groove 56 in which the beam splitter 3 is disposed can be easily and accurately formed. Therefore, the positional accuracy and the angular accuracy of each of the beam splitters 3 can be secured. For example, when the groove 56 is formed in the first support body 5 by using an end mill, a tip of the end mill is suppressed from being shaken during processing. Therefore, the groove 56 can be easily and accurately formed in the first support body 5.

In addition, in the spectroscopic module 1, in the corresponding groove 56 and beam splitter 3, the beam splitter 3 is disposed in the groove 56 so as to be in contact with the side surface 56*a* of the pair of side surfaces 56*a* and 56*b* and the bottom surface 56*c*, the side surface 56*a* being located on the one side in the Z direction. Accordingly, in addition to securing the positional accuracy of each of the beam splitters 3, each of the plurality of beam splitters 3 can be stably supported.

In the spectroscopic module 1, the casing 2 has a long shape having the X direction as the longitudinal direction, and the first support body 5 has a long shape having the X direction as the longitudinal direction. The casing 2 having a long shape having the X direction as the longitudinal direction is likely to be distorted in the X direction by impact, heat, or the like from outside. Since the first support body 5 having a long shape having the X direction as the longitudinal direction similarly is disposed with respect to the casing 2 having such a long shape to be in surface contact with the third wall portion 23 of the casing 2, the first support body 5 serves as a beam of the casing 2. Therefore, particularly, the casing 2 can be prevented from being distorted in the X direction.

The present disclosure is not limited to the above embodiment. For example, in the embodiment, the plurality of beam splitters 3 are arranged along the first direction (X direction), and the plurality of bandpass filters 4 and the like are disposed on the one side in the second direction (Z direction) with respect to the plurality of beam splitters 3. Namely, in the above embodiment, the second direction (Z direction) is a direction perpendicular to the first direction (X direction); however, the second direction may be a direction intersecting the first direction. In addition, in the above embodiment, the meaning of "to be in contact with" is not limited to a case where a member and a member are in contact with each other, and includes a case where a film such as adhesive agent is disposed between a member and a member.

In addition, the first support body 5 is attached to the third wall portion 23 such that at least a part of the outer surface 5*b* is in contact with at least a part of the inner surface 2*b*. Even in the spectroscopic module 1 described above, the plurality of beam splitters 3 are supported on the first support body 5, and the plurality of bandpass filters 4 are supported on the second support body 6. Accordingly, as compared with when the plurality of beam splitters 3 and the plurality of bandpass filters 4 are supported on the same support body that is integrally formed, in the first support body 5, the positional accuracy between the beam splitters 3 adjacent to each other can be further secured due to the structure corresponding to the plurality of beam splitters 3, and in the second support body 6, the positional accuracy between the bandpass filters 4 adjacent to each other can be further secured due to the structure corresponding to the plurality of bandpass filters 4. In addition, the third wall portion 23 of the casing 2 is integrally formed with the second support body 6, and the first support body 5 is attached to the third wall portion 23 such that at least a part of the first support body 5 is in surface contact with at least a part of the third wall portion 23 of the casing 2. Accordingly, the positional accuracy between the beam splitter 3 and the bandpass filter 4 facing each other can be secured at least in a direction in which the outer surface 5*b* and the inner surface 2*b* face each other. Further, since the strength of the casing 2 is improved, a problem with the positional relationship between each other in the plurality of beam splitters 3 and the plurality of bandpass filters 4, which is caused by deformation or the like of the casing, is unlikely to occur. As a result, according to the spectroscopic module 1 described above, the positional accuracy between each other in the plurality of beam splitters 3 and the plurality of bandpass filters 4 can be secured. In addition, in the spectroscopic module 1 described above, when seen in the X direction, the first support body 5 is attached to the third wall portion 23 that is located on a back side of the casing 2 (on the one side in the Y direction with respect to the first wall portion 21, the second wall portion 22, and the fourth wall portion 24). Therefore, the alignment accuracy of the optical axis can be improved, and the first support body 5 can be stably held.

Figure 8:
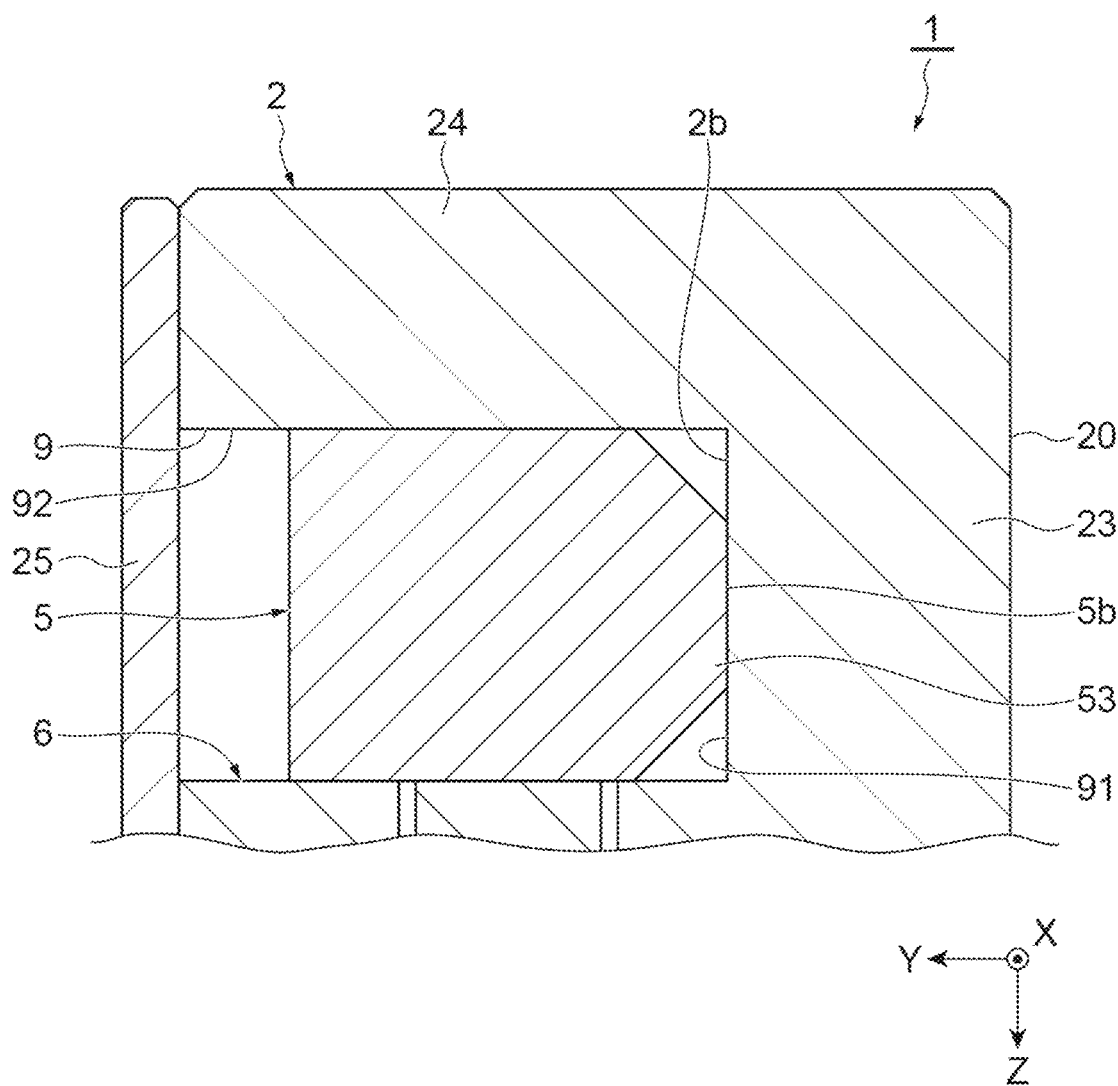
FIG. 8 is a cross-sectional view of a portion of a casing and a first support body of a first modification example.
Figure 9:
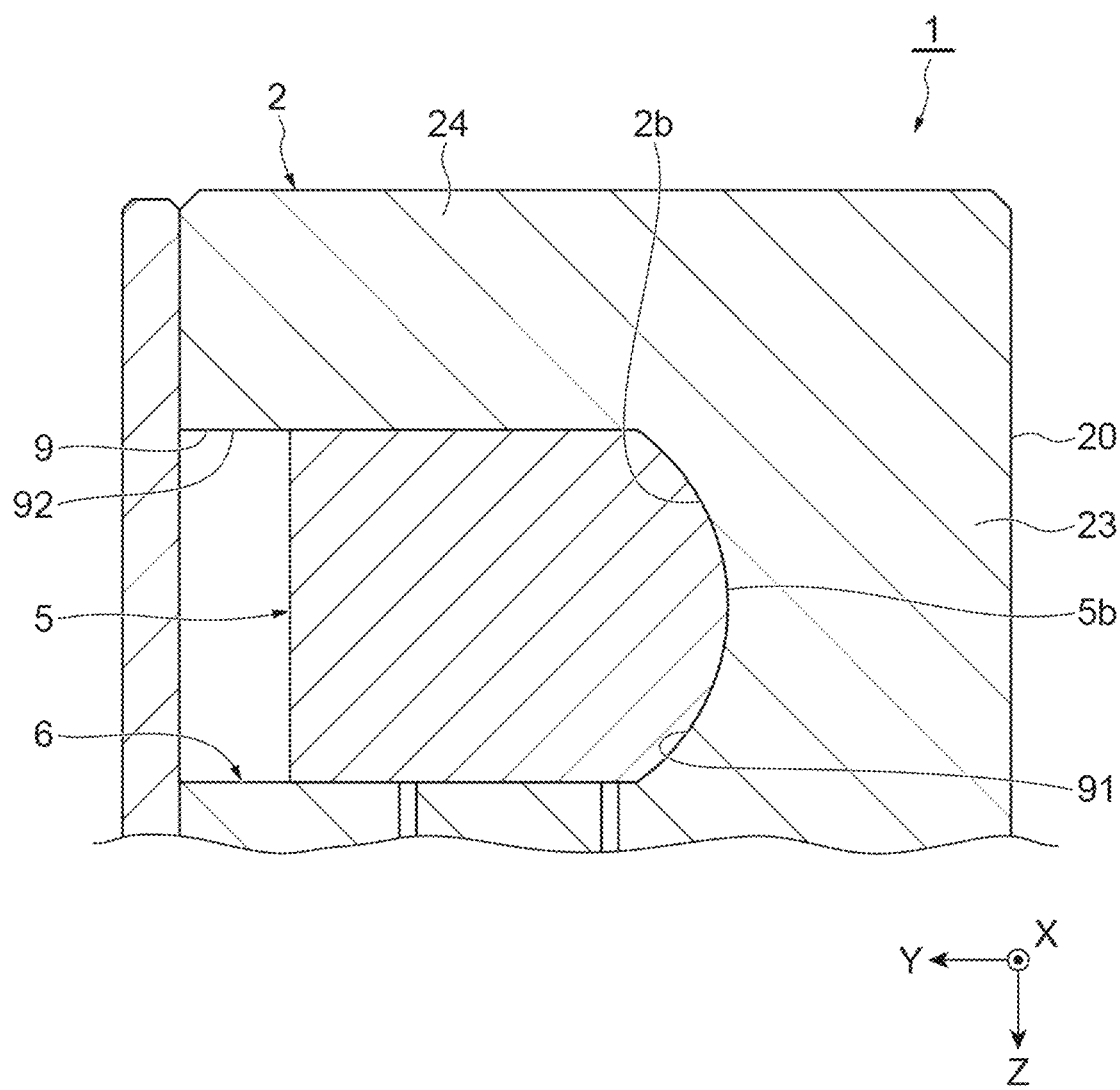
FIG. 9 is a cross-sectional view of a portion of a casing and a first support body of a second modification example.

Examples in which the first support body 5 is attached to the third wall portion 23 such that at least a part of the outer surface 5*b* is in contact with at least a part of the inner surface 2*b* will be described below. In the example illustrated in FIG. 8, the third wall portion 53 has a shape in which corners facing each other in the Z direction are chamfered, and the outer surface 5*b* is disposed in the recessed portion 9 in a state where the outer surface 5*b* is in contact with a part of the inner surface 2*b*. The outer surface 5*b* is attached to the third wall portion 23 so as to be in contact with a part of the inner surface 2*b*. In addition, in the example illustrated in FIG. 9, the third wall portion 53 protrudes in a round shape, and the third wall portion 23 is recessed in a round shape. The center of curvature of the inner surface 2*b* coincides with the center of curvature of the outer surface 5*b*. Namely, the outer surface 5*b* and the inner surface 2*b* are formed in a curved shape along each other. The outer surface 5*b* is disposed in the recessed portion 9 in a state where the outer surface 5*b* is in contact with the inner surface 2*b*. The outer surface 5*b* is attached to the third wall portion 23 so as to be in contact with the inner surface 2*b*.

In addition, the casing 2 may accommodate at least the plurality of beam splitters 3 and the plurality of bandpass filters 4. In addition, a portion of the casing 2 may be formed of a portion of at least one of the first support body 5, the second support body 6, and the light detector 7. In addition, the light incident surface 4*a* of each of the bandpass filters 4 is located on the one side in the Z direction from the bottom surface 63*a* of the recessed portion 63 in which the light shielding member 8 is disposed, but may be located at the same position as that of the bottom surface 63*a*.

In addition, each of the beam splitters 3 may be a dichroic mirror that reflects light in different wavelength bands and transmits light other than the light in the reflected wavelength bands. In addition, each of the beam splitters 3 is not limited to having a plate shape, and may have a block shape. In addition, as long as each of the beam splitters 3 has a long shape when seen in the thickness direction of each of the beam splitters 3, each of the beam splitters 3 may have a polygonal shape, an elliptical shape, or the like as a specific shape. In addition, the plurality of beam splitters 3 may be formed, for example, by forming at least two dielectric multilayer films on one preform. Namely, a plurality of portions, each of which functions as the beam splitter 3, may be provided, and the preform on which each of the plurality of portions is disposed is not required to be divided. In addition, the plurality of bandpass filters 4 may be formed, for example, by forming at least two dielectric multilayer films on one preform. Namely, a plurality of portions, each of which functions as the bandpass filter 4, may be provided, and the preform on which each of the plurality of portions is disposed is not required to be divided. In addition, the light detector 7 may be a PD array or the like in which the plurality of light receiving regions 7*a* are formed on one semiconductor substrate. In addition, the light detector 7 may be a photomultiplier tube.

In addition, in the above embodiment, the casing 2 includes the plurality of positioning holes 2*c* as a defining portion; however, at least one of the second support body 6 and the casing 2 may include a defining portion that defines the position of the first support body 5 in a plane parallel to both the X direction and the Z direction or in a plane along both the X direction and the Z direction. The defining portion provided in the second support body 6 and the casing 2 may be, for example, a contact region that is provided in the side surface 92 of the recessed portion 9 so as to be in contact with the first support body 5, the first support body 5 disposed in the recessed portion 9. In addition, the first support body 5 may include a first engagement portion, and the casing 2 may include a second engagement portion as the defining portion, the second engagement portion engaged with the first engagement portion. In that case, one of the first engagement portion and the second engagement portion may be formed of a plurality of positioning holes, and the other of the first engagement portion and the second engagement portion may be formed of positioning pins, each of the positioning pins fitted into each of the plurality of positioning holes.

In addition, in the above embodiment, the second support body 6 includes the positioning pins 6*a*, and the light shielding member 8 includes the positioning holes 8*b*; however, the second support body 6 may include a first engagement portion, and the light shielding member 8 may include a second engagement portion engaged with the first engagement portion. In that case, one of the first engagement portion and the second engagement portion may be formed of a plurality of positioning holes, and the other of the first engagement portion and the second engagement portion may be formed of positioning pins, each of the positioning pins fitted into each of the plurality of positioning holes.

In addition, in the above embodiment, when seen in the X direction, the first light incident hole 2*a* has a circular shape, and the second light incident hole 5*a* has an oval shape having the Z direction as a longitudinal direction, but the second light incident hole 5*a* may include the first light incident hole 2*a*. As one example in which the second light incident hole 5a includes the first light incident hole 2a, for example, when seen in the X direction, there is provided a case were the shape of the second light incident hole 5a is the same as the shape of the first light incident hole 2a and the outer edge of the first light incident hole 2a coincides with the outer edge of the second light incident hole 5a.

In addition, when the beam splitter 3 has a plate shape and has a thickness of 1 mm or less (more preferably, a thickness of 0.5 mm or less), if the number of all the beam splitters 3 is M (M is a natural number of 2 or more), each of N (N is a natural number of 2 to M) beam splitters 3 among M beam splitters 3 may have a plate shape and have a thickness of 1 mm or less (more preferably, a thickness of 0.5 mm or less). Incidentally, all the beam splitters 3 each may have a plate shape and have a thickness of 1 mm or less (more preferably, a thickness of 0.5 mm or less) (the case of M=N).

In addition, in the above embodiment, when seen in the Y direction, the corners of the first support body 5 have a linearly chamfered shape; however, the shape of the corners of the first support body 5 is not particularly limited. When seen in the Y direction, the corners of the first support body 5 may have, for example, a round chamfered shape or may not have, for example, a non-chamfered shape.

According to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; a first support body that supports the plurality of beam splitters; a second support body that supports the plurality of bandpass filters; and a casing that includes a wall portion integrally formed with the second support body and accommodates the plurality of beam splitters and the plurality of bandpass filters. An outer surface parallel to both the first direction and the second direction is formed in the first support body. An inner surface parallel to both the first direction and the second direction is formed in the wall portion. At least one of the second support body and the casing includes a defining portion that defines a position of the first support body in a plane parallel to both the first direction and the second direction. The first support body is attached to the wall portion such that the outer surface is in contact with the inner surface in a state where the position is defined by the defining portion.

In the spectroscopic module, the plurality of beam splitters are supported on the first support body, and the plurality of bandpass filters are supported on the second support body. Accordingly, as compared with when the plurality of beam splitters and the plurality of bandpass filters are supported on the same support body that is integrally formed, in the first support body, the positional accuracy between the beam splitters adjacent to each other can be further secured due to a structure corresponding to the plurality of beam splitters, and in the second support body, the positional accuracy between the bandpass filters adjacent to each other can be further secured due to a structure corresponding to the plurality of bandpass filters. In addition, the wall portion of the casing is integrally formed with the second support body, and the first support body is attached to the wall portion of the casing to be in surface contact with the wall portion in a state where the position of the first support body is defined by the defining portion. Accordingly, the positional accuracy between the beam splitter and the bandpass filter facing each other can be secured. Further, since the strength of the casing is improved, a problem with a positional relationship between each other in the plurality of beam splitters and the plurality of bandpass filters, which is caused by deformation or the like of the casing, is unlikely to occur. As a result, according to the spectroscopic module, the positional accuracy between each other in the plurality of beam splitters and the plurality of bandpass filters can be secured.

In the spectroscopic module according to one aspect of the present disclosure, the first support body may include a first engagement portion, and the casing may include a second engagement portion as the defining portion, the second engagement portion engaged with the first engagement portion. Accordingly, the first support body can be positioned with respect to the casing, so that the first support body can be positioned with respect to the second support body which is integrally formed with the wall portion of the casing. Therefore, the positional accuracy between the beam splitter and the bandpass filter facing each other can be easily and reliably secured.

In the spectroscopic module according to one aspect of the present disclosure, one of the first engagement portion and the second engagement portion may be formed of a plurality of positioning holes, and the other of the first engagement portion and the second engagement portion may be formed of a plurality of positioning pins, each of the plurality of positioning pins fitted into each of the plurality of positioning holes. Accordingly, with a simple structure, the first support body can be positioned with respect to the casing.

In the spectroscopic module according to one aspect of the present disclosure, the casing may define a recessed portion having the inner surface as a bottom surface, and a side surface of the recessed portion may include a separation region separated from the first support body. Accordingly, for example, when damage or the like is found in a beam splitter, for example, a jig is inserted between the first support body and the separation region, so that the first support body which supports the beam splitter can be easily removed from the recessed portion.

In the spectroscopic module according to one aspect of the present disclosure, a first light incident hole through which light is incident into the casing along the first direction may be formed in the casing. A second light incident hole through which light is incident on the plurality of beam splitters along the first direction may be formed in the first support body. The second light incident hole may include the first light incident hole when seen in the first direction. Accordingly, it can be suppressed that the light incident from the first light incident hole is diffusely reflected around the second light incident hole to generate stray light.

In the spectroscopic module according to one aspect of the present disclosure, each of the plurality of beam splitters may have a plate shape. A plurality of grooves may be formed in the first support body. Each of the plurality of beam splitters may be disposed in each of the plurality of grooves so that the first support body is provided with a plurality of combinations each including a groove and a beam splitter. In each of the plurality of combinations, the groove may have a width twice or more a thickness of the beam splitter. Accordingly, during production of the spectroscopic module, the groove in which the beam splitter is disposed can be easily and accurately formed. Therefore, the positional accuracy of each of the plurality of beam splitters can be secured.

In the spectroscopic module according to one aspect of the present disclosure, in each of the plurality of combinations, the groove may have a pair of side surfaces each having a light passage opening formed therein, and a bottom surface. In each of the plurality of combinations, the beam splitter may be disposed in the groove so as to be in contact with the side surface of the pair of side surfaces and the bottom surface, the side surface being located on the one side in the second direction. Accordingly, in addition to securing the positional accuracy of each of the plurality of beam splitters, each of the plurality of beam splitters can be stably supported.

In the spectroscopic module according to one aspect of the present disclosure, the casing may have a long shape having the first direction as a longitudinal direction. The first support body may have a long shape having the first direction as a longitudinal direction. The casing having a long shape having the first direction as the longitudinal direction is likely to be distorted in the first direction by impact, heat, or the like from outside. Since the first support body having a long shape having the first direction as the longitudinal direction similarly is disposed with respect to the casing having such a long shape to be in surface contact with the wall portion of the casing, the first support body serves as a beam of the casing. Therefore, particularly, the casing can be prevented from being distorted in the first direction.

Alternatively, according to one aspect of the present disclosure, there is provided a spectroscopic module including: a plurality of beam splitters that are arranged along a first direction; a plurality of bandpass filters that are disposed on one side in a second direction intersecting the first direction with respect to the plurality of beam splitters, each of the plurality of bandpass filters facing each of the plurality of beam splitters; a light detector that is disposed on the one side in the second direction with respect to the plurality of bandpass filters and includes a plurality of light receiving regions, each of the plurality of light receiving regions facing each of the plurality of bandpass filters; a first support body that supports the plurality of beam splitters; a second support body that supports the plurality of bandpass filters; and a casing that includes a wall portion integrally formed with the second support body and accommodates the plurality of beam splitters and the plurality of bandpass filters. An outer surface is formed in the first support body. An inner surface is formed in the wall portion. The first support body is attached to the wall portion such that at least a part of the outer surface is in contact with at least a part of the inner surface.

In the spectroscopic module, the plurality of beam splitters are supported on the first support body, and the plurality of bandpass filters are supported on the second support body. Accordingly, as compared with when the plurality of beam splitters and the plurality of bandpass filters are supported on the same support body that is integrally formed, in the first support body, the positional accuracy between the beam splitters adjacent to each other can be further secured due to a structure corresponding to the plurality of beam splitters, and in the second support body, the positional accuracy between the bandpass filters adjacent to each other can be further secured due to a structure corresponding to the plurality of bandpass filters. In addition, the wall portion of the casing is integrally formed with the second support body, and the first support body is attached to the wall portion such that at least a part of the first support body is in surface contact with at least a part of the wall portion of the casing. Accordingly, the positional accuracy between the beam splitter and the bandpass filter facing each other can be secured at least in a direction in which the outer surface and the inner surface face each other. Further, since the strength of the casing is improved, a problem with a positional relationship between each other in the plurality of beam splitters and the plurality of bandpass filters, which is caused by deformation or the like of the casing, is unlikely to occur. As a result, according to the spectroscopic module, the positional accuracy between each other in the plurality of beam splitters and the plurality of bandpass filters can be secured.

What is claimed is:

1. A spectroscopic module comprising:
   a plurality of beam splitters that are arranged along a first direction;
   a plurality of bandpass filters that are disposed on one side in a second direction intersecting the first direction with respect to the plurality of beam splitters, each of the plurality of bandpass filters facing each of the plurality of beam splitters;
   a light detector that is disposed on the one side in the second direction with respect to the plurality of bandpass filters and includes a plurality of light receiving regions, each of the plurality of light receiving regions facing each of the plurality of bandpass filters;
   a first support body that supports the plurality of beam splitters;
   a second support body that supports the plurality of bandpass filters; and
   a casing that includes a wall portion integrally formed with the second support body and accommodates the plurality of beam splitters and the plurality of bandpass filters,
   wherein an outer surface parallel to both the first direction and the second direction is formed in the first support body,
   an inner surface parallel to both the first direction and the second direction is formed in the wall portion,
   at least one of the second support body and the casing includes a defining portion that defines a position of the first support body in a plane parallel to both the first direction and the second direction, and
   the first support body is attached to the wall portion such that the outer surface is in contact with the inner surface in a state where the position is defined by the defining portion.

2. The spectroscopic module according to claim 1,
   wherein the first support body includes a first engagement portion, and
   the casing includes a second engagement portion as the defining portion, the second engagement portion engaged with the first engagement portion.

3. The spectroscopic module according to claim 2,
   wherein one of the first engagement portion and the second engagement portion is formed of a plurality of positioning holes, and
   the other of the first engagement portion and the second engagement portion is formed of a plurality of positioning pins, each of the plurality of positioning pins fitted into each of the plurality of positioning holes.

4. The spectroscopic module according to claim 1,
   wherein the casing defines a recessed portion having the inner surface as a bottom surface, and
   a side surface of the recessed portion includes a separation region separated from the first support body.

5. The spectroscopic module according to claim 1,
wherein a first light incident hole through which light is incident into the casing along the first direction is formed in the casing,
a second light incident hole through which light is incident on the plurality of beam splitters along the first direction is formed in the first support body, and
the second light incident hole includes the first light incident hole when seen in the first direction.

6. The spectroscopic module according to claim 1,
wherein each of the plurality of beam splitters has a plate shape,
a plurality of grooves are formed in the first support body,
each of the plurality of beam splitters is disposed in each of the plurality of grooves so that the first support body is provided with a plurality of combinations each including a groove and a beam splitter, and
in each of the plurality of combinations, the groove has a width twice or more a thickness of the beam splitter.

7. The spectroscopic module according to claim 6,
wherein in each of the plurality of combinations, the groove has a pair of side surfaces each having a light passage opening formed therein, and a bottom surface, and
in each of the plurality of combinations, the beam splitter is disposed in the groove so as to be in contact with a side surface of the pair of side surfaces and the bottom surface, the side surface being located on the one side in the second direction.

8. The spectroscopic module according to claim 1,
wherein the casing has a long shape having the first direction as a longitudinal direction, and
the first support body has a long shape having the first direction as a longitudinal direction.

9. A spectroscopic module comprising:
a plurality of beam splitters that are arranged along a first direction;
a plurality of bandpass filters that are disposed on one side in a second direction intersecting the first direction with respect to the plurality of beam splitters, each of the plurality of bandpass filters facing each of the plurality of beam splitters;
a light detector that is disposed on the one side in the second direction with respect to the plurality of bandpass filters and includes a plurality of light receiving regions, each of the plurality of light receiving regions facing each of the plurality of bandpass filters;
a first support body that supports the plurality of beam splitters;
a second support body that supports the plurality of bandpass filters; and
a casing that includes a wall portion integrally formed with the second support body and accommodates the plurality of beam splitters and the plurality of bandpass filters,
wherein an outer surface is formed in the first support body,
an inner surface is formed in the wall portion, and
the first support body is attached to the wall portion such that at least a part of the outer surface is in contact with at least a part of the inner surface.

10. The spectroscopic module according to claim 9,
wherein at least one of the second support body and the casing includes a defining portion that defines a position of the first support body, and
the first support body is attached to the wall portion such that at least the part of the outer surface is in contact with at least the part of the inner surface in a state where the position is defined by the defining portion.

11. The spectroscopic module according to claim 10,
wherein the first support body includes a first engagement portion, and
the casing includes a second engagement portion as the defining portion, the second engagement portion engaged with the first engagement portion.

12. The spectroscopic module according to claim 11,
wherein one of the first engagement portion and the second engagement portion is formed of a plurality of positioning holes, and
the other of the first engagement portion and the second engagement portion is formed of a plurality of positioning pins, each of the plurality of positioning pins fitted into each of the plurality of positioning holes.

13. The spectroscopic module according to claim 9,
wherein the casing defines a recessed portion having the inner surface as a bottom surface, and
a side surface of the recessed portion includes a separation region separated from the first support body.

14. The spectroscopic module according to claim 9,
wherein a first light incident hole through which light is incident into the casing along the first direction is formed in the casing,
a second light incident hole through which light is incident on the plurality of beam splitters along the first direction is formed in the first support body, and
the second light incident hole includes the first light incident hole when seen in the first direction.

15. The spectroscopic module according to claim 9,
wherein each of the plurality of beam splitters has a plate shape and has a thickness of 1 mm or less.

16. The spectroscopic module according to claim 9,
wherein each of the plurality of beam splitters has a plate shape,
a plurality of grooves are formed in the first support body,
each of the plurality of beam splitters is disposed in each of the plurality of grooves so that the first support body is provided with a plurality of combinations each including a groove and a beam splitter, and
in each of the plurality of combinations, the groove has a width twice or more a thickness of the beam splitter.

17. The spectroscopic module according to claim 16,
wherein in each of the plurality of combinations, the groove has a pair of side surfaces each having a light passage opening formed therein, and a bottom surface, and
in each of the plurality of combinations, the beam splitter is disposed in the groove so as to be in contact with a side surface of the pair of side surfaces and the bottom surface, the side surface being located on the one side in the second direction.

18. The spectroscopic module according to claim 9,
wherein the casing has a long shape having the first direction as a longitudinal direction, and
the first support body has a long shape having the first direction as a longitudinal direction.

\* \* \* \* \*